H. M. McCLELLAN.
Bee Hive.

No. 18,757.

2 Sheets—Sheet 1.

Patented Dec. 1, 1857.

H. M. McCLELLAN.
Bee Hive.

No. 18,757.

2 Sheets—Sheet 2.

Patented Dec. 1, 1857.

UNITED STATES PATENT OFFICE.

HENRY M. McCLELLAN, OF YORK, PENNSYLVANIA.

BEEHIVE.

Specification of Letters Patent No. 18,757, dated December 1, 1857.

*To all whom it may concern:*

Be it known that I, HENRY M. MCCLELLAN, of York, in the county of York and State of Pennsylvania, have invented a new and useful Improvement in Collateral Beehives; and I do hereby declare that the following is a full and exact description thereof, reference being had to the accompanying drawings and to the letters of reference marked thereon.

Apiarians have found it difficult to construct beehives in such a manner that a swarm of bees could be divided so as to prevent swarming and the consequent occasional loss of the new colony by escape to the woods. By long study of the habits of bees and observation upon the defects of known hives I have succeeded in constructing a hive which appears to me to possess almost every desirable characteristic, and enables one person to manage successfully the division of a swarm.

My invention consists in the peculiar construction of a continuous hive, made in sections, in combination with tolling and feeding cups, ventilating tubes and revolving bee-doors, the whole constructed and arranged as will hereinafter be more fully described.

Figure 2:
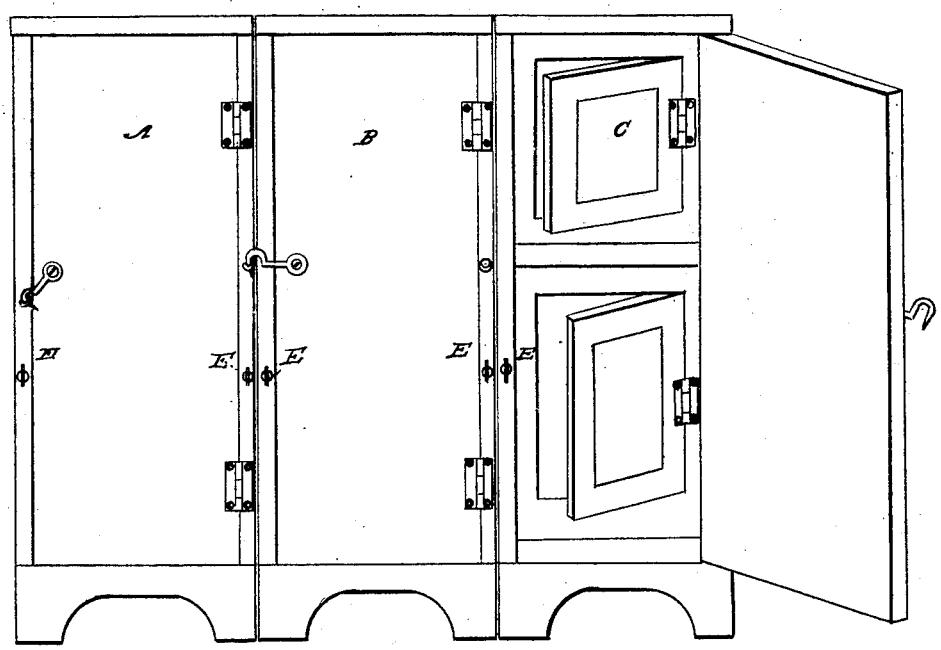

My hive is constructed in sections hooked together in front and rear, the hook on the door of each hive entering a staple in the hive adjoining it, by means of which the hook is made to perform two functions, viz, fastening the hive door and holding the two sections together, as shown in the accompanying drawings A, B, C, Figure 2. Each of these sections is complete in itself for the accommodation of a single swarm of bees. Between the sections are bee-doors of a peculiar construction, which may be opened or closed at pleasure, so as to afford a communication from one section to another, or complete separation of the hive into three.

Figure 1:
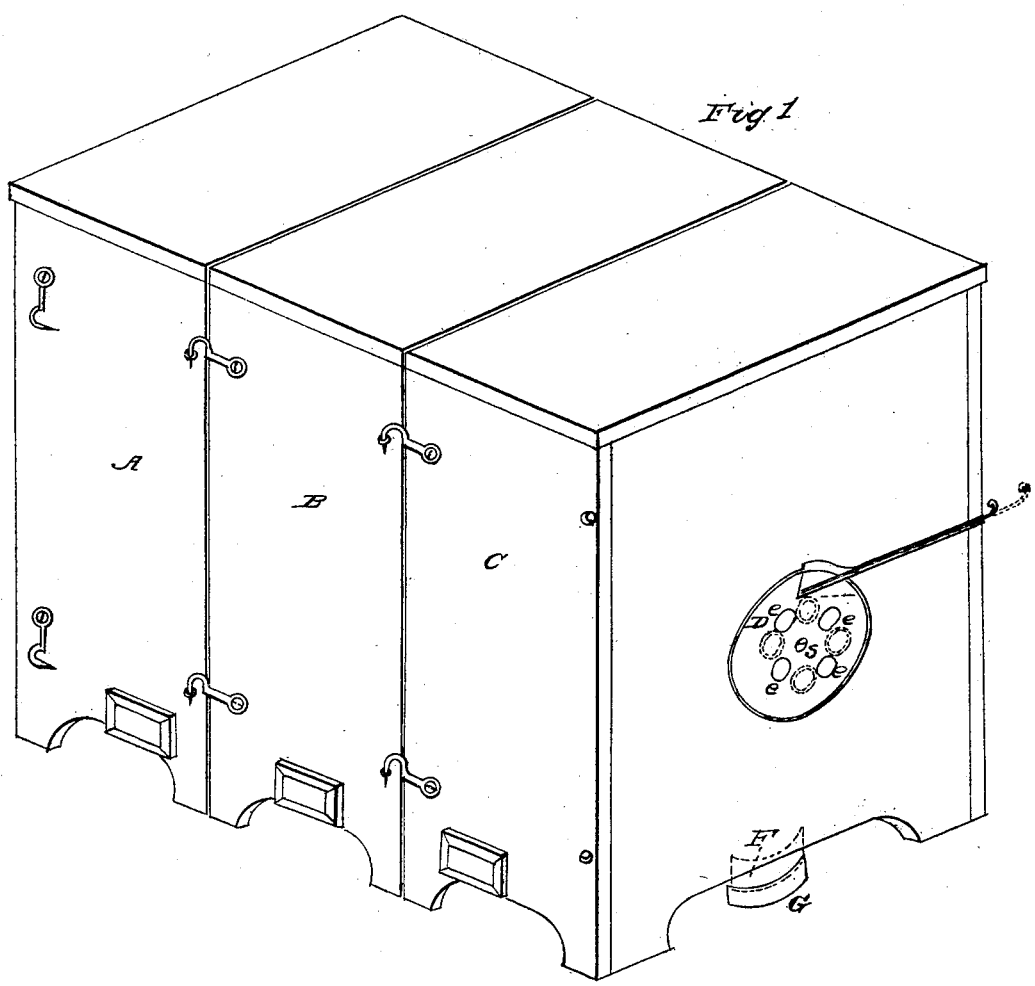

On each end of the different sections is a bee-door as shown in the drawings at D, Fig. 1. This door is constructed and operated as follows. With a bit or auger of the size of the door D, the end board of the hive is bored half-way through; then several small holes, seen in black dotted lines, are bored quite through into the hive. Then into the door D are bored several small holes, shown at e, e. The door D, is then fastened by the screw s, in its center. By pulling the wire E, this door D will be carried through a partial revolution so as to bring the holes in the door opposite those in the hive, as seen in red dotted lines. When the door is in this position the bees can pass freely through the openings. Then by pushing upon the wire the door is again closed.

If the doors be not well made, and the millers in consequence get in, the latter may readily be destroyed by agitating the doors by the wires E. The wire E passes from the bee-door through a hole bored in the side of the section, as shown in the drawings, a portion of the side of a section being broken away to show the wire and hole. The hole is so inclined that water will flow from the door instead of flowing toward it, and the hole is too small to harbor millers or other vermin.

When the divisions A, B, C, are standing together as seen in the drawings, the two corresponding bee-doors will be exactly opposite each other, and when they are both opened the passage from hive to hive is complete.

If we have a single swarm of bees in division B, and a new swarm is about to leave the same, it will only be necessary to open the bee-door communicating with A and the new colony will readily take possession of A, and commence to make honey there for themselves. When a second swarm is about to leave the parent family, it may be conducted to division C. Before a third swarming it may be best to move the hive B to another place, leaving undisturbed the new swarms in A and C. It will be well to replace B, on its removal, by an empty division, to preserve the usual appearance about A, and C, and to be ready to receive a new swarm from either of them.

In the bottom of each hive is inserted a tin tube F, upon the lower end of which is a cup G. This cup can be reached by the hand without disturbing the bees and affords a safe and convenient mode of feeding them. When the bees are about to swarm, the door D is opened so as to give free access to the new section. The cup G should then be supplied with fresh clover blossoms or other food which will attract the bees into the new hive. This cup may be readily removed and the hive cleaned by brushing the dirt through the tube F, which tube may also serve as a ventilator.

My hive is supplied with the usual removable honey boxes in the top and with doors and windows in the rear, to afford opportunity for inspecting the interior of the hive, as shown in Fig. 2.

Having thus fully described my invention, what I claim and desire to secure by Letters Patent of the United States is:

The combination of the sections A, B, C, connected as shown, with the rotating doors D, agitating and regulating wires E, ventilating tubes F and tolling and feeding cups G, the said parts being constructed and arranged in relation to each other in the manner and for the purposes described.

H. M. McCLELLAN.

Witnesses:
 EDW. F. BROWN,
 DANIEL BREED.